United States Patent Office 3,271,161
Patented Sept. 6, 1966

3,271,161
POULTRY FEED CONTAINING ABOUT 1%
DIATOMACEOUS EARTH
John C. Eshleman, Box 9, Greencastle, Pa.
No Drawing. Filed June 22, 1964, Ser. No. 377,099
5 Claims. (Cl. 99—4)

This invention relates to the raising of poultry including feeding, care, and disposition of the same and to poultry feed which constitutes one of the vital factors in the successful operation of a poultry farm.

The invention relates particularly to poultry feed intended to promote growth, to increase egg production with thicker egg shells, and to improve all-around poultry and egg production.

Much thought and effort have been devoted to the raising of poultry, including the feeding and care of the same in order to obtain maximum efficiency including growth and maximum production in eggs and poultry, and efforts in this direction have been directed to the physical facilities and to the feed intended to contribute to the desired end, resulting in progress but with the ultimate still sought but not obtained.

It is an object of the invention to provide a poultry feed including a feed supplement which will give improved results in growth of the poultry, increased and improved egg production, dryness of litter, and all-around efficiency.

Other objects and advantages of the invention will be apparent from the following description.

Briefly stated the invention involves the adding of hydrated amorphous silica, commonly referred to as diatomaceous earth, to poultry feed, such material being taken from the earth, run through a primary dryer, ground, further dried until it contains 5 to 10 percent moisture, then further ground to the desired range of fineness so that a minimum of 100 percent will pass through a 20-mesh screen and a maximum of 80 percent will pass through a 200-mesh screen, such range of fineness and moisture being highly important for the use intended.

The product thus obtained is added to any regular poultry feed without removing any of the ingredients as primarily it does not supply vitamins or proteins, but on the other hand the beneficial effect of this supplement is due to the catalytic effect on the assimilation of the other ingredients in the feed. Added as an extra ingredient, it is neutral and will not react with any normal feed ingredient any more than corn or limestone flour.

The present invention is a supplement prepared to be added to any regular poultry feed and be thoroughly mixed therewith without removal of any portion of the feed. In preparing the product of the present invention hydrated amorphous silica, commonly known as diatomaceous earth, is removed from the earth deposit and run through a primary dryer to remove excess moisture, after which it is subjected to grinding to reduce it to small particles or granules. It is then further dried to reduce the moisture to from 5 to 10 percent, after which it is again ground to a pulverant fineness or minimum fineness that 100 percent will pass through a 20-mesh screen and a maximum fineness that 80 percent will pass through a 200-mesh screen. This range of fineness and moisture is critical.

The product thus produced is added to any regular poultry feed without the removal of any portion thereof, in view of the fact that the product does not take the place of any of the ingredients of the feed and does not supply appreciable vitamins and proteins, notwithstanding the fact that it abounds in unicellular or colonial algae, silicified skeletons of which form kieselguhr or diatomaceous earth. The effect of this product as set forth is due to the beneficial effect on the assimilation of the other ingredients in the feed. Consequently it is added as an extra ingredient and because it is neutral it will not react with any normal feed ingredient any more than corn or limestone flour.

It is desired to control the amount of the product in poultry feed and to use from 2/10ths of 1 percent to 2 percent, the product being of analysis as follows:

|  | Percent |
|---|---|
| $SiO_2$ | 94.83 |
| $Fe_2O_3$ | 2.46 |
| $AL_2O_3$ | 1.98 |
| $MgO$ | 0.73 |
| Total | 100 |

As an example of a poultry feed formula the following has been found satisfactory as a starting and growing feed:

|  | Lbs. |
|---|---|
| Corn meal | 1200 |
| Wheat middlings | 100 |
| Soybean meal | 500 |
| Vitamin and animal protein supp. | 200 |
| Codliver oil (fat) | 30 |
| Salt | 6 |
| Dicalcium phos. | 12 |
| Limestone flour | 25 |
| Cocci-state (Nydrafur) | 1 |
| Diatomite | 20 |

In order to arrive at the effectiveness of the product it has been tested by use, the first use being as a feed supplement. In order to illustrate the increase in feed efficiency, better egg shell production and dryer litter, the following has been found efficacious:

|  | Lbs. |
|---|---|
| Corn meal | 1300 |
| Wheat middlings | 100 |
| Ground barley | 50 |
| Crab meal | 100 |
| Animal protein | 80 |
| Soybean meal | 250 |
| Deh. alfalfa meal | 50 |
| Dicalcium phos. | 20 |
| Limestone flour | 80 |
| Salt | 6 |
| Vitamins and trace minerals | 15 |
| Diatomite | 20 |

Further use to determine increased feed efficiency, better egg shells and dryer litter involved the following:

On September 1, 1963, I put 400 leghorn hens and 400 sex link hens on regular complete eggmash with 1% diatomite added. For 2 weeks prior to doing this I checked the amount of feed these hens were consuming.

Then checked the amount they consumed with the diatomite in the feed. They ate 7% less feed with no reduction in egg production, plus an increase in shell strength.

On February 14, 1964, I started a controlled test in cages. I put 10 leghorn hens in each of two cages. Group A being control cage, and group B being test cage.

Group A was given regular complete eggmash and water free choice.

Group B was given regular complete eggmash with 1% diatomite and water free choice.

After 35 days' test the following results were ascertained:

*Group A*

| | |
|---|---|
| No. birds left | 7 |
| No. eggs laid | 191 |
| Lbs. feed ate | 95 |
| Litter moisture | Fair |

*Group B (with diatomite)*

| | |
|---|---|
| No. birds left | 10 |
| No. eggs laid | 192 |
| Lbs. feed ate | 88 |
| Litter moisture | Excellent |

Increased feed efficiency 7% plus. And it was observed that birds in cages had better health (less strain) when feed contained diatomite.

Also on May 1, 1964, I put 3500 leghorn birds on feed containing 1% diatomite. At the end of 2 weeks the feed consumption had gone down 7% with no reduction in egg production.

It will be obvious to one skilled in the art that various changes may be made in the invention without departing from the spirit and scope thereof and therefore the invention is not limited by that which is described in the specification, but only as indicated in the accompanying claims.

What is claimed is:

1. A complete poultry feed consisting essentially of a mixture of conventional poultry feed nutrients and additives and about 1% of diatomaceous earth.

2. The poultry feed of claim 1, in which the diatomaceous earth is of a granular size such that 100% will pass through a 20 mesh screen and 80% will pass through a 200 mesh screen.

3. The poultry feed of claim 1, in which the diatomaceous earth has a moisture content of from 5% to 10%.

4. A poultry feed for use as a starting and growing feed consisting esesntially of a plurality of substances in the following proportions:

| | Lbs. |
|---|---|
| Corn meal | 1200 |
| Wheat middlings | 100 |
| Soybean meal | 500 |
| Vitamin and animal protein supp. | 200 |
| Codliver oil (fat) | 30 |
| Salt | 6 |
| Dicalcium phos. | 12 |
| Limestone flour | 25 |
| Cocci-state (Nydrafur) | 1 |
| Diatomite | 20 |

5. A method of preparing a feed for poultry which includes the steps of subjecting diatomaceous earth to a primary drying operation to remove excess moisture, grinding said diatomaceous earth to a granular consistency, further drying said diatomaceous earth to reduce the moisture content to from 5 to 10% by weight, again grinding said diatomaceous earth to a range of minimum fineness where 100% will pass through a 20-mesh screen and a maximum fineness where 80% will pass through a 200-mesh screen, and combining and thoroughly mixing said dried and ground diatomaceous earth with nutrient feed materials as a supplement thereto, the ratio of said diatomaceous earth supplement to said nutrient feed materials being on the order of 1% by weight of the complete product.

References Cited by the Examiner

UNITED STATES PATENTS

| | | | |
|---|---|---|---|
| 2,162,609 | 6/1939 | Dawe | 99—4 |
| 2,965,488 | 12/1960 | Belasco | 99—2 |
| 3,078,164 | 2/1963 | De Lisle | 99—2 |

OTHER REFERENCES

Hackh's Chemical Dictionary, 3rd ed., pp. 465, 549, McGraw-Hill Book Company, Inc., New York, N.Y. (1944).

Mudd, S. W., Industrial Minerals and Rocks. The American Institute of Mining and Metallurgical Engineers, New York. 1949 (pp. 305, 306, 569 and 570).

A. LOUIS MONACELL, *Primary Examiner.*

D. DONOVAN, *Assistant Examiner.*